Patented Dec. 1, 1931

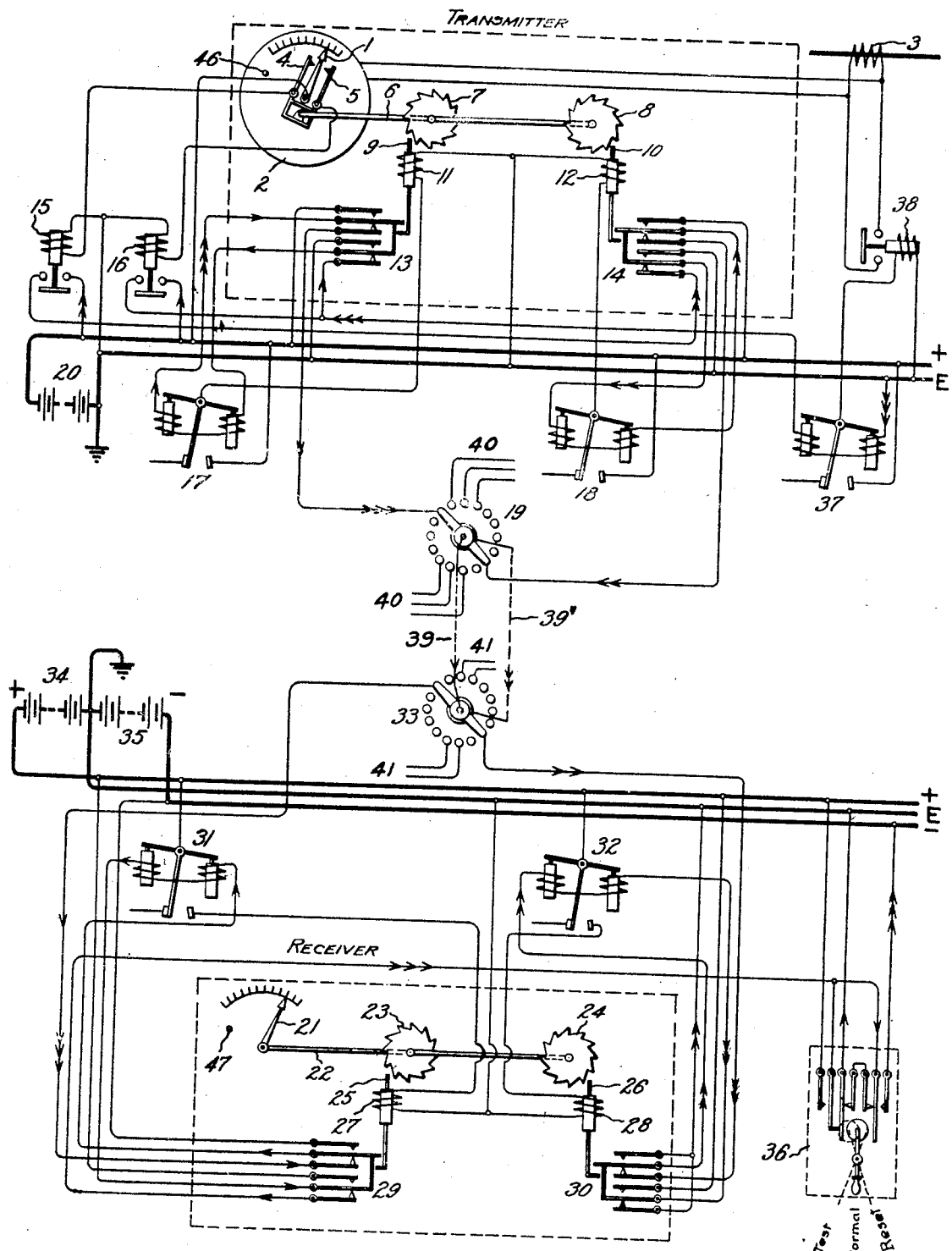

1,834,800

UNITED STATES PATENT OFFICE

HERBERT STANLEY PETCH, OF LONDON, AND EDWARD L. E. WHEATCROFT, OF CAMBRIDGE, ENGLAND, ASSIGNORS TO GENERAL ELECTRIC COMPANY, A CORPORATION OF NEW YORK

TELEMETRIC SYSTEM

Application filed November 12, 1926, Serial No. 148,088, and in Great Britain January 2, 1926.

Our invention relates to a telemetric system and in particular to various improvements in such a system employing step-by-step relay devices for its operation.

Cases frequently arise in which it is desired to know at one point the value of some quantity of a variable nature which can only be conveniently measured at a remote point. Such cases occur, for example, in connection with remotely-controlled generation stations or sub-stations in which such quantities as load, water level, winding temperatures, etc. can advantageously be indicated or recorded at the point from which such stations are controlled.

The object of the present invention is to provide the required indication in a more reliable manner than has been possible hitherto and further to allow of a large number of such indications being transmitted practically continuously over a minimum number of wires.

The invention consists particularly of a transmitter which is built into, or attached to, the instrument which is used for measuring the variable quantity at the remote point; a pair of lines connecting this transmitter to the point at which the indication is to be given; and an indicator which may consist substantially of a pointer moving over a scale, the movements of the pointer being controlled by the variations in the position of the needle or corresponding part of the measuring instrument at the remote point.

The transmitter may consist of an arrangement such as a pair of contacts between which the needle or corresponding part of the measuring instrument is located, in such a manner that it will engage one or the other of the contacts should there be an increase or decrease in the value of the measured quantity. The closure of one or the other of such contacts is arranged through various means to energize the coils of two notching devices, one of which is located at each end of the line, and the pawls associated with these notching devices thus rotate the ratchet wheels. At the indicating end this motion of the ratchet wheel causes the pointer of the indicator to move a certain distance over its scale. At the transmitter end the motion of the ratchet wheel is arranged to move the controlling contacts associated with the measuring instrument needle in such a direction that they tend to open the circuit which was closed by the original movement of the needle.

Both the pointer of the indicator and the controlling contacts of the transmitter may be connected to a pair of such ratchet wheels, each wheel of a pair being arranged to be driven in the opposite direction. It is thus possible to give indications of either an increase or decrease in the measured quantity. The double ratchet wheel and notching device are not, however, essential as the same idea may be carried out by other means.

The motion of the notching device which causes the rotation of the ratchet wheel is also arranged to restore the intermediate operating circuits to their original position. The notching action will, therefore, continue until the needle of the measuring instrument is spaced between the controlling contacts.

The features of our invention which are believed to be novel and patentable will be pointed out in the claims appended hereto.

The accompanying drawing shows a preferred arrangement according to the invention.

The needle 1 of the measuring instrument 2 which, for example, is shown connected to a current transformer 3, is spaced centrally between the controlling contacts 4 and 5. These controlling contacts are shown mounted on a follow-up member carried on the shaft 6 to which are also attached the ratchet wheels 7 and 8, these being driven by the pawls 9 and 10 when these are lifted by the operating coils 11 and 12. Associated with the pawls 9 and 10 are the contact devices 13 and 14. In order to ensure definite contact for controlling the operation of the device the controlling contacts 4 and 5 are arranged to operate auxiliary relays 15 and 16 respectively. Other apparatus located at the transmitting end are polarized relays 17, 18 and 37, the distributor 19 and the battery 20.

At the indicating end it will be observed that the pointer 21 of the indicator is attached by means of the shaft 22 to the ratchet wheels 23 and 24, which are driven by the pawls 25 and 26 when these are lifted by the operating coils 27 and 28. Associated with pawls 25 and 26 are contact devices 29 and 30. Also located at the indicating end are polarized relays 31 and 32, distributor 33, batteries 34 and 35 and test switch 36.

Before proceeding to detail the operation of this particular arrangement it should be noted that distributors 19 and 33 are not essential to the scheme, but form a means of giving indications of a large number of quantities over a few wires. These distributors may be adjusted manually or may be motor-driven and synchronized in accordance with one of several known manners. The polarized relays 17, 18, 31 and 32 are also not essential to the arrangement, but form a convenient means of carrying it into effect. These relays are of such construction that when traversed by a current in one direction the armature will throw over and remain in that position after the cessation of the current until traversed by a current in the opposite direction. The contact devices 13, 14, 29 and 30 are reversing switches for the coils of relays 17, 18, 31 and 32 respectively.

It will be understood that in the event of the indicating end not being separated from the transmitting end by a very great distance it may be more economical to employ individual lines rather than the distributor arrangement shown. The apparatus will perform its function quite satisfactorily under these conditions and there will be no need for the provision of separate batteries at the two ends.

Let it be supposed that an increase occurs in the primary current traversing current transformer 3. The pointer 1 of ammeter 2 will therefore move in a clockwise direction and will engage with contact 5, thus completing a circuit for relay 16 which will operate. The closing of the contact of relay 16 completes a circuit shown by the single arrow-heads from the positive end of battery 20 through contact device 13 in the position represented, the coils of relay 17, contact device 13, distributor 19, line 39, distributor 33, contact device 29, in the position represented, coils of relay 31, contact device 29, and so to earth or ground circuit marked E through test key 36 in the normal position represented. Current will traverse relays 17 and 31 in the same direction and this current will cause the armatures of both relays to throw over.

The contacts of relay 17 complete the circuit for operating coil 11 whereupon pawl 9 will rise, rotate ratchet wheel 7 by one step and at the same time cause contact device 13 to throw over. The throwing over of contact device 13 changes the connections of the coils of 17, so that they are now traversed by a current in the reverse direction from the negative side of battery 20 through the upper contacts of the lower pole of switch 13, to relay 17, back to the upper contacts of the upper pole of switch 13, and then to the positive side of battery 20, and consequently the armature of 17 will be thrown back to its original position and the contacts of the relay will interrupt the circuit of operating coil 11, whereupon pawl 9 and contact device 13 will return to their normal position by gravity. In a similar manner the closing of the contacts of relay 31 will cause pawl 25 to rotate ratchet wheel 23 by one step and the simultaneous operation of contact device 29 will restore relay 31, pawl 25 and contact device 29.

It will be observed, therefore, that ratchet wheel 7 and consequently shaft 6 and contacts 4 and 5 have been moved one step clockwise. Similarly pointer 21 has been moved one step clockwise by ratchet wheel 23. If the increase of current traversing current transformer 3 is of considerable magnitude the pointer 1 will still be engaging contact 5. The action will therefore be repeated and contacts 4 and 5 and pointer 21 will make another step clockwise and this process will continue until contacts 4 and 5 move sufficiently clockwise to break contact between needle 1 and contact 5. The reversing switches and the polarized relay thus ensure the repeated operation of the notching relay after contacts 1 and 5 are closed until said contacts are open regardless of the number of notching operations necessary to accomplish this.

A similar but reverse action takes place in the event of a decrease in current through transformer 3, causing needle 1 to move to the left and engage with contact 4, relays 15, 18 and 12, contact device 14, and ratchet wheel 8 being affected at the transmitting end, and the corresponding devices, relays 32 and 26, contact device 30 and ratchet wheel 24 at the indicating end. The direction and path of the current is shown by the double arrowheads through line 39'.

In order to check and determine that the indication of pointer 21 is substantially that of needle 1, and to eliminate the possibility of accumulative error due to failure to notch, test key 36 is provided. This operates in conjunction with polarized relay 37 at the transmitting end with which is associated contactor relay 38. When key 36 is thrown to "test" the connection of one end of the coils of relay 31 is removed from earth and connected to the negative side of the battery 35. The coils of relay 37 are connected to the transmitting end of the corresponding line and to earth. When the contacts of relay 16 close, during the normal operation of the device, current traverses relay 37, but its direction is such that the contacts of the relay are held open. When test key 36 is thrown to "test", however, current flows from the negative connection at the indicating end through the coils of relays 31 and 17 and to earth through the coils of relay 37, as shown by the triple-headed arrows. This current is in such a direction that the line contacts of relays 17 and 31 close, and thus cause a notch to be taken and the contacts of relay 37 are thrown over, thus completing the circuit for contactor 38. When contactor 38 operates it short circuits current transformer 3, thus shunting all current from the coil of ammeter 2. Needle 1 therefore immediately commences to return to its zero position, but in doing so will engage with contact 4.

It will thus be apparent that immediately the test key is thrown to "test" contacts 4 and 5 and pointer 21 should commence to notch back in a counter-clockwise direction until pointer 21 indicates zero. The ratchet wheels 8 and 24 are arranged so that contacts 4 and 5 and pointer 21 can just be notched back to zero, for example, by providing stops 46 and 47 for contact 4 and pointer 21 respectively, but further impulses in the anti-clockwise direction to have no effect. If pointer 21 and contacts 4 and 5 have fallen out of step, therefore, whichever of them reaches zero first will remain there until the discrepancy is taken up.

When the "test" is complete and it is desired to restore the apparatus to its ordinary condition, key 36 is thrown to "reset". This connects one end of the windings of relay 31 to the positive side of battery 35 and current therefore flows through coils of relays 31, 17 and 37 to earth. This current is in such a direction that the contact of relays 31 and 17 are held open while the armature of relay 37 is thrown over, thus opening the circuit of contactor 38. This takes the short-circuit off current transformer 3, and the needle of ammeter 2, therefore, attempts to move to its correct position. In so doing it engages contact 5 and therefore contacts 4 and 5 and pointer 21 will proceed to notch in a clockwise direction until a point is reached when needle 1 is equidistant between contacts 4 and 5.

It will be observed that only the single pair of lines 39 and 39' is required between the transmitting and receiving stations and that this pair of lines serves for the forward and backward motion transmitting operations respectively as well as for testing operation. During testing the testing impulses are transmitted over wire 39 leaving wire 39' free to carry the impulses necessary to cause the backward movement of indicator 21.

The operation as described in detail is for the case in which the quantity to be indicated is current. It is clear that the same operation would be equally effective if the measuring instrument 2 were connected to measure any other electrical quantity. It would also function satisfactorily if instead of needle 1 being operated electrically it were operated, for example, by a float to indicate water level or any such physical quantity. In cases where it is not permissible to short-circuit the measuring instrument contactor 38 may be arranged to open-circuit the coil of instrument 2 or in any other way to suppress the indication which is being transmitted.

It will be obvious that the two distributors 19 and 33 and the lines 39 and 39' can be used for transmitting indications from other instruments associated with conductors 40 to other indicators associated with conductors 41.

In accordance with the provisions of the patent statutes, I have described the principle of operation of my invention, together with the apparatus which I now consider to represent the best embodiment thereof; but I desire to have it understood that the apparatus shown is only illustrative, and that the invention may be carried out by other means.

What we claim as new and desire to secure by Letters Patent of the United States, is:—

1. An electrically operated motion transmission system comprising a transmitting station and a receiving station, a movable indicator member at the transmitting station, a second movable indicating member at the receiving station, electroresponsive means including a circuit between said stations, for causing the second member to repeat correspondingly the movement of the first member, a polarized relay at the sending station energized in one direction during the normal operation of said system, means controllable from the receiving station for energizing said relay in the other direction, and means responsive to the operation of said relay when energized in said other direction for moving the first indicating member to a definite fixed position to cause the electroresponsive means to move the second indicating member to a similar definite position.

2. An electrically operated motion transmission system comprising a transmitting station and a receiving station, a movable indicator member at the transmitting station, a second movable indicating member at the receiving station, electroresponsive means including a pair of wires between said stations for causing the second member to repeat correspondingly the movement of the first member, the movement of said indicators in a forward direction employing one of said wires and the movement of the indicators in a backward direction employing the other wire, means controllable from the receiving station for moving the first indicating member toward a zero indicating position, said means being controlled over the wire normally employed for the forward movement of the indicators whereby the other wire is available for the operation of the movement of the second indicator when the first mentioned indicator is thus returned toward a zero position.

3. An electrically operated motion transmission system comprising a transmitting station and a receiving station, a movable indicator member at the transmitting station, a second movable indicating member at the receiving station, electro-responsive means, including a circuit between said stations, for causing the second member to repeat correspondingly the movement of the first member such that there is possibly a lack of correspondence in position between said members, said system also including means controllable from the receiving station for moving the first indicating member to a definite fixed position to cause the electro-responsive means to move the second indicating member to a similar definite position in the event that the members are not in corresponding positions.

In witness whereof, we have hereunto set our hands.

HERBERT STANLEY PETCH.
EDWARD L. E. WHEATCROFT.